C. W. HOWLAND.
MACHINE FOR CUTTING LENSES.
APPLICATION FILED SEPT. 12, 1912.
1,141,896.
Patented June 1, 1915.
3 SHEETS—SHEET 1.
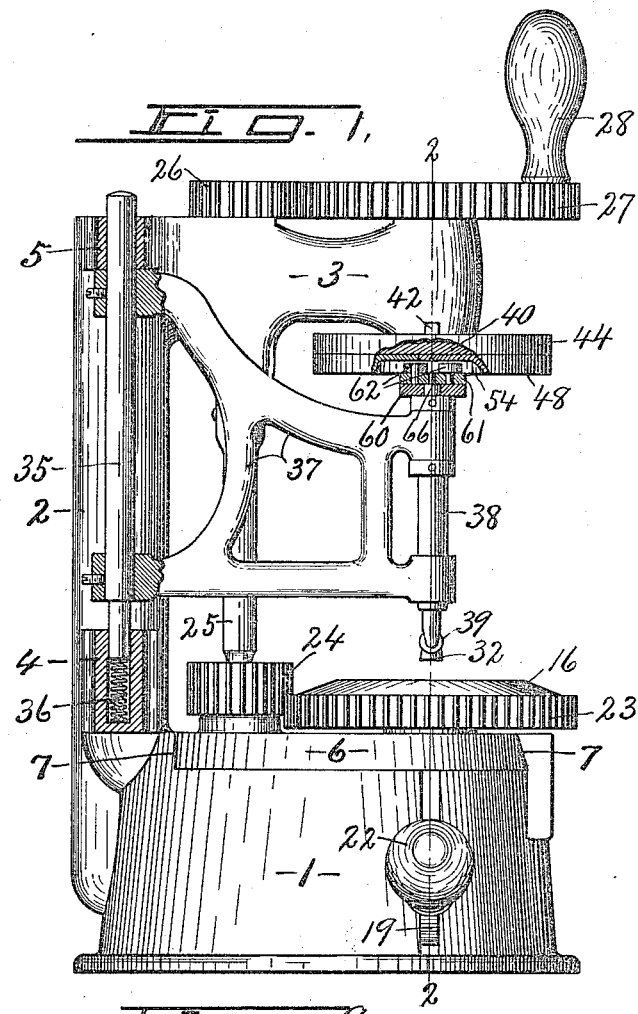
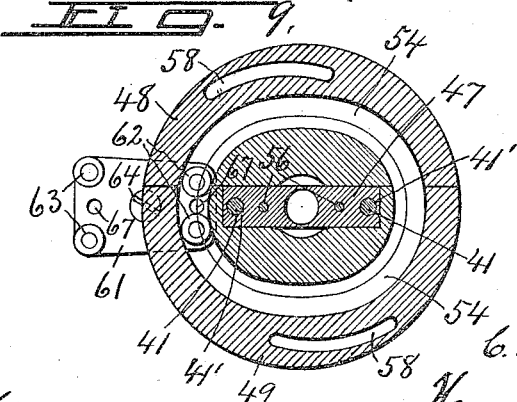

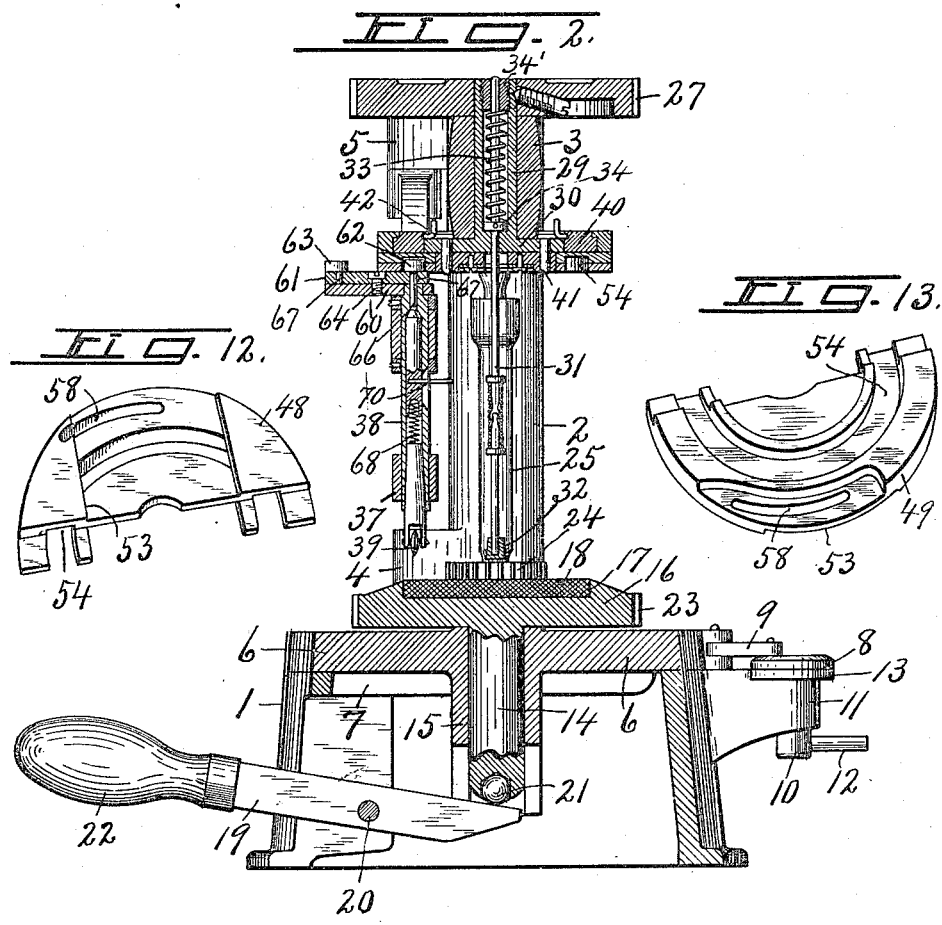

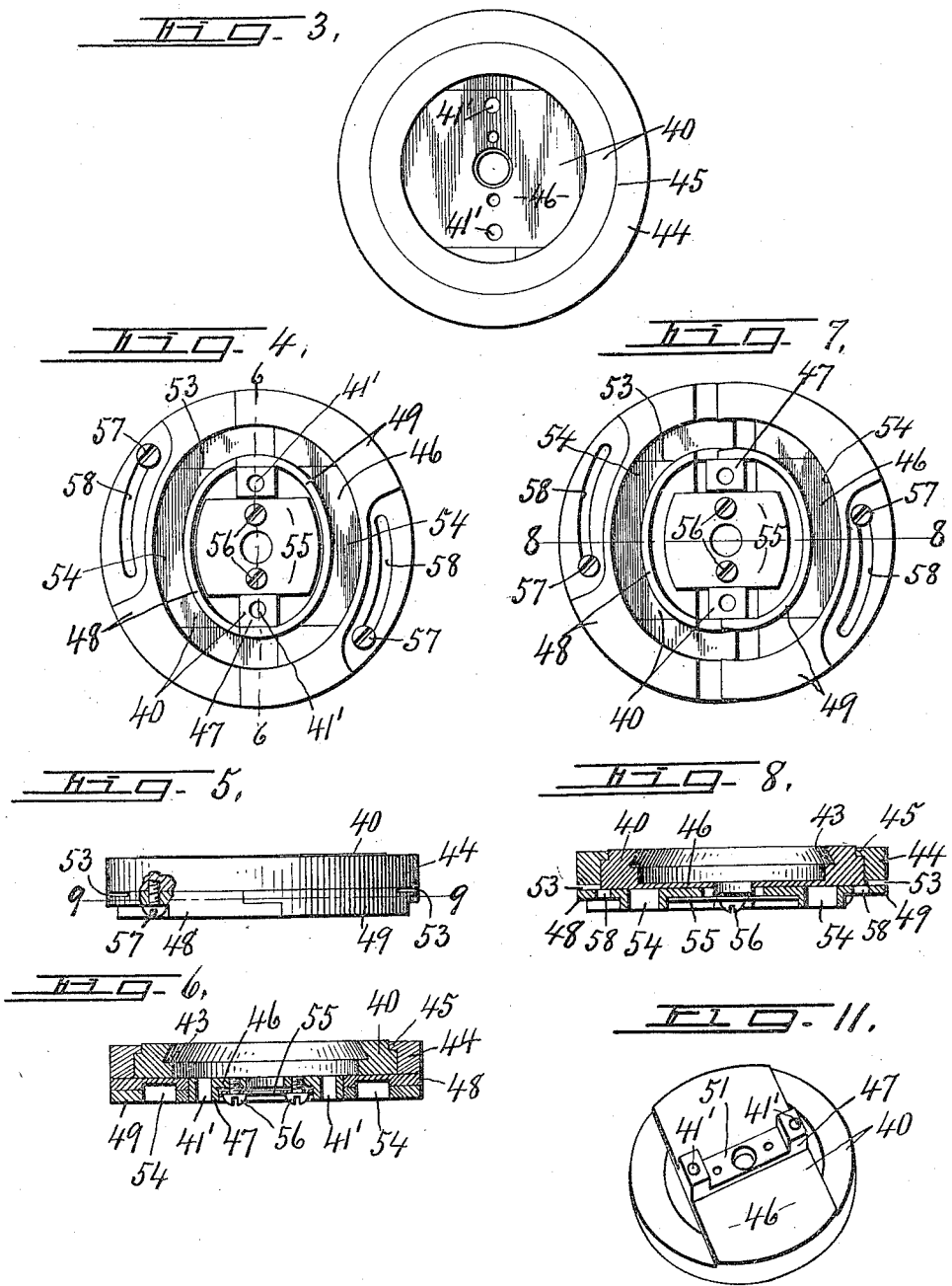

UNITED STATES PATENT OFFICE.

CHAUNCEY W. HOWLAND, OF GENEVA, NEW YORK, ASSIGNOR TO THE STANDARD OPTICAL COMPANY, OF GENEVA, NEW YORK, A CORPORATION OF NEW YORK.

MACHINE FOR CUTTING LENSES.

1,141,896.   Specification of Letters Patent.   Patented June 1, 1915.

Application filed September 12, 1912. Serial No. 719,939.

*To all whom it may concern:*

Be it known that I, CHAUNCEY W. HOWLAND, of Geneva, in the county of Ontario, in the State of New York, have invented new and useful Improvements in Machines for Cutting Lenses, of which the following, taken in connection with the accompanying drawings, is a full, clear, and exact description.

This invention relates to certain improvements in machines for cutting lenses somewhat similar to that set forth in my Patent #701,046, May 27, 1902, except that it refers more particularly to the lens former or means for imparting motion to the cutter to give the lens the desired form.

In mounting lenses for eyeglasses or spectacles, it is desirable, if not necessary, to have the mechanical centers of the lenses the same distances apart as the pupilary distance between the eyes in order that the lenses if accurately ground may be properly focused. These lenses are generally more or less elliptical in form but vary materially in size, and while the main object of my present invention is to provide an adjustable former which may be used in connection with a cutter for producing these various sizes of lenses, the specific object is to avoid any variation in the length of the major axis and at the same time to permit a relatively wide variation in the transverse width or length of the minor axis, thereby keeping the center of the lenses the proper pupilary distance apart when mounted for eyeglasses or spectacles. In other words I have sought to produce a former which is adjustable transversely of its major axis for the purpose of increasing the width of the lens without materially affecting its length, whereby lenses of widely varying transverse or vertical width may be assembled in the same mountings with the assurance that the centers of the lenses will be substantially the same distances apart corresponding to the pupilary distance between the eyes.

Another object is to provide adjustable cutter shifting means co-acting with the former for slightly deforming the outline of the lens from that of the former, as, for example, increasing the curvature of the lens where the corresponding portion of the former is of comparatively long radius and reducing the curvature of the lens where the corresponding portion of the former is of relatively short radius.

Other objects and uses relating to specific parts of the lens forming means will be brought out in the following description.

In the drawings—Figure 1 is a side elevation, partly in section, of a lens cutting machine embodying the various features of my invention. Fig. 2 is a transverse vertical sectional view of the same machine taken on line 2—2, Fig. 1. Figs. 3, 4 and 5 are respectively a top plan, an inverted plan and an edge view of the detached lens former, a portion of Fig. 5 being in section to show one of the screws connecting the section. Fig. 6 is a transverse vertical sectional view of the same former taken on line 6—6, Fig. 4. Fig. 7 is an inverted plan of the detached former adjusted or expanded to produce a larger sized lens. Fig. 8 is a transverse vertical sectional view of the expanded former taken on line 8—8, Fig. 7. Fig. 9 is a horizontal sectional view of the same former taken on line 9—9, Fig. 5 showing the coöperating head of the cutter spindle in top plan in position for cutting the lens to approximately the same contour as the former. Fig. 10 is a horizontal sectional view similar to Fig. 9 showing the head of the cutter spindle as adjusted for cutting the lens to a slightly different or more oval form than that of the former. Fig. 11 is a perspective view of the detached base plate of the former. Figs. 12 and 13 are perspective views of the opposite adjustable lens forming sections.

This machine comprises a hollow base —1— having an upright standard —2— rising from the rear side thereof and terminating at its upper end in a forwardly projecting arm —3—, the standard —2— being provided with integral laterally projecting arms —4— and —5— located respectively near the base and top of the standard, all of which parts are preferably made of cast metal.

Mounted upon the top of the base —1— is a laterally and horizontally slidable bed —6— which is guided in suitable ways —7— and adapted to be operated by means of a rotary eccentric —8— and link —9— connecting said eccentric to the adjacent side of the bed, said eccentric and link being usually located at the right-hand side of the base, the eccentric being provided with a pendant shaft or spindle —10— journaled in a bracket —11— and adapted to be operated by a handle —12— projecting laterally from the lower end of the shaft or spindle. The object of this adjustment is to permit the lens to be shifted relatively to the cutter for cutting different sizes of lenses, the eccentric being provided with an index movable around a graduated plate —13— to indicate the degree of shifting movement of the bed —6— and consequently the size of the lens to be cut. A vertical shaft or spindle —14— is centrally journaled in a suitable bearing —15— centrally in the bed —6— and is provided at its upper end with an enlarged head or disk —16— forming a lens support, which is preferably made of metal and is provided in its upper face with a central socket —17— in which is fitted a cushion disk —18— of cork or equivalent material upon which the lens to be cut is adapted to rest to prevent breakage by direct contact with the metal and also to increase the friction between the lens and support to cause it to rotate therewith during the cutting operation. This lens support is normally in a plane some distance below the cutter, presently described, and is adapted to be elevated to bring the lens into contact with the cutter by means of a hand lever —19— which is pivoted intermediate its ends at —20— to a bracket on the interior of the base —1— and has its inner end engaged with an end thrust bearing or step —21— on the lower end of the spindle —14—, the outer end of the lever being provided with a handle —22— by which it may be operated to elevate the lens support, the latter together with the lever being returned by gravity to their normal positions.

The periphery of the lens support —16— is provided with a circular series of teeth constituting a gear —23— which meshes with a pinion —24— just at the rear thereof. This pinion is also journaled in the sliding bed —6— and is connected by a universal joint to an upright shaft section —25—, the latter being also connected by a universal joint to a superposed upright shaft section which is journaled in the arm —3— and carries at its upper end a pinion —26— adapted to mesh with a hand driven gear —27— having an operating handle —28—. This gear —27— is secured to the upper end of a hollow upright shaft —29— which is journaled in a suitable bearing in the front end of the arm —3— and has its lower end provided with an enlarged head or disk —30— bearing against the underside of the arm and together with the gear —27— holding the shaft —29— against endwise vertical movement by bearing against the lower and upper faces of the arm —3—.

The lens to be cut is frictionally held upon its support —16— by means of a flexible shaft —31— having its lower end provided with a rubber tip —32— for direct engagement with the lens and its upper end journaled in a suitable aperture in the sleeve —29— in which is also located a coil spring —33— having one end bearing against a shoulder —34— on the shaft —31— and its upper end engaged with a screw bushing —34'— in the upper end of the sleeve so as to cause the lower end of the shaft —31— to press the lens upon its support under yielding adjustable pressure. A vertical rock shaft —35— is journaled at its lower and upper ends in the arms —4— and —5— of the standard —2—, the lower arm —4— being provided with a socket in which is seated a coil spring —36— supporting the shaft —35— and parts carried thereby.

Secured to the shaft —35— is a horizontally swinging bracket —37— carrying upon its forward end a vertical rock shaft —38— for receiving and supporting a lens cutter —39—, the latter being disposed some distance below the lower edge of the bracket —37— and together with said bracket being held above the plane of the lens support —16— by means of the spring —36—. Sufficient clearance is left between the lower side of the bracket —37— and upper face of the arm —4— to permit the bracket with the cutter thereon to be depressed for the purpose of disengaging the cutter supporting spindle from the former when desired.

The parts thus far described are substantially the same as those shown and described in my patent previously referred to and I will now proceed to describe the lens forming mechanism forming the subject matter of this invention.

*Lens former.*—The lens former comprises a circular base plate —40— which is detachably interlocked with the lower end or disk —30— of the sleeve —29— by means of pins —41— and a spring locking member —42—, said pins being secured to the disk —30— and projecting downwardly therefrom into alined apertures —41'— in the underlying portion of the base plate —40— to cause said base plate to rotate with the sleeve —29—, the spring —42— being compressible by hand but normally resting on the upper face of the disk —30— and being tensioned radially to enter an annular groove —43— in the inner face of the plate —40— to hold said plate against downward endwise displacement from the disk. By compressing this spring —42— to withdraw it from the groove —43—, the entire former including the base plate —40— may be withdrawn downwardly when the bracket —37— is depressed and rocked laterally from beneath the former.

Rotatably mounted upon the circular base plate —40— is a ring —44— having its upper end provided with an inturned flange —45— fitting in an annular groove in the adjacent portion of the base plate to hold the ring against downward displacement and permit it to be easily rotated on said plate.

The underside of the base plate —40— is provided with a raised flat rib —46— extending diametrically thereof and is also provided with another diametrically extending but relatively narrow rib —47— at right angles to the raised portion —46—, the raised portion —46— forming a guide for a pair of diametrically opposite substantially semi-circular cam plates —48— and —49—. The opposite edges of the raised portion —46— are parallel, while the undersides of the remaining portions of the plate are flat and substantially parallel with the underside of the raised portion —46—.

The transverse rib —47— is provided with apertures —41'— for receiving the locking pins —41— on the lower end of the sleeve —29—, the central portion of the rib —47— being cut away to form a recess —51— for a purpose presently described.

The cam plates —48— and —49— are provided in their upper sides with diametrically extending grooves or recesses —53— of substantially the same vertical depth as the raised portion —46— which they are adapted to receive, the width of the grooves being about the same as the width of said raised portion so as to allow the cam plates to slide freely thereon and at the same time affording means by which the cam plates are slidably interlocked with the base plate to rotate therewith. Each of the cam plates is provided in its underside with a substantially semi-elliptical groove —54—, each forming a continuation of the other at the ends to complete the approximately elliptical form of the groove. The meeting edges of these plates overlap and are adapted to slide one upon the other to form continuations of the groove and also continuations of the sides thereof which latter constitute inner and outer elliptical bearings. The lens former is therefore substantially circular in general outline and divided diametrically along the major axis of the elliptical groove, thereby forming similar semi-circular plates which are adjustable transversely of the major axis and are provided with parallel semi-elliptical bearing faces forming the opposite walls of the groove for directing the movements of the lens cutter in a manner hereinafter described. These cam plates are slidable radially in parallelism along and upon the raised portion —46— and are held in place by means of a clamping plate —55— which is secured by a suitable fastening means as screws —56— to the cross rib —47— within the recess —51—, the ends of said clamping plate —55— extending laterally from the cross rib and under the adjacent portions of the cam plates at the inner sides of the grooved portions thereof.

The means for adjusting the grooved plates of the former radially and transversely of the major axis comprises the ring —44— and suitable pins or studs —57— which, in this instance, consist of screws passed through cam slots —58— in the marginal edges of the grooved plates —48— and —49— at diametrically opposite sides of the axis of the former, said slots being elongated circumferentially but eccentrically about said axis so that when the studs are shifted rotarily toward one end of the slots, the plates —48— and —49— will be forced apart and when shifted to the opposite ends of the slots, said plates will be brought together, thereby increasing in the first instance the minor axis or transverse width of the lens and in the other instance reducing such axis or transverse width. It will be observed, however, that in both of such adjustments the major axis or length of the lens remains substantially the same. The clamping plate —55— is provided with a central aperture registering with a similar aperture in the base plate —40— for receiving the lens holding spindle —31—.

Secured to the upper end of the cutter spindle —38— is a laterally projecting head —60— upon which is pivotally mounted a rotarily adjustable plate —61— carrying at its opposite ends separate pairs of studs or rollers —62— and —63—, those of each pair being positioned equi-distant at opposite sides of the pivot as —64— corresponding to the distance between said pivot and axis of the cutter spindle so that either set of rollers may be registered with the groove —54— of the former whereby to coöperate with said former for directing the movements of the cutter spindle and cutter thereon in the operation of cutting the lens to the desired form. This cutter supporting plate —61— may be held in either of its adjusted positions by any suitable detent consisting, in this instance, of a pin plunger —66— movable axially within the hollow cutter spindle —38— and adapted to be forced into alined sockets —67— in the plate —61— by means of a coil spring —68— also located within the drill spindle.

Suitable means, as a finger piece —70—, is provided for withdrawing the plunger from interlocking engagement with the plate —61— against the action of the spring —68—, said finger piece extending through an elongated slot in one side of the cutter spindle. It is apparent, however, that this adjustment of the plate —61— cannot be made until the active set of studs or rollers —62— have been withdrawn from operative connection with the former which may be done by depressing the bracket —37— against the action of the spring —36— and swinging said bracket laterally to bring the plate —61— and rollers carried thereby out from under the former.

It will be observed that one set of rollers as —62— are relatively close together as shown more clearly in Fig. 9, while the other set of rollers as —63— are spaced a greater distance apart at opposite sides of the axis of the cutter spindle. It is therefore clear that when either set of rollers —62— are brought into operative co-action with the former in the groove —54—, their bearing surfaces upon the walls of the groove serve to hold the cutter tangential to all portions of the ellipse presented thereto by the rotation of the lens and former. It is also apparent that when the studs —62— are brought into co-action with the former in the groove —54— in which the contact surfaces are closer together, the cutter will follow more closely a medial elliptical line between the inner and outer walls of the groove and thereby conform more closely to the shape of the former, as shown more clearly in Fig. 9. On the other hand when the other set of studs —63— are brought into co-action with the former within the groove —54— in which the bearing points are considerably farther apart, the axis of the cutter spindle and therefore the cutter will be caused to approach slightly closer to the axis of rotation of the former and lens when the portions of the former of greatest curvature are presented to said studs, while the presentation of the portions of the former of less curvature to the studs will cause a corresponding recession of the cutter spindle and cutter from the axis of revolution of the lens and lens form. In other words when the lens form is elliptical or substantially so and the rollers or studs —63— are brought into co-action therewith, the curvature of the ends of the lens at the ends of the major axis will be slightly less or of greater radius than that of the corresponding ends of the lens form, while the curvature at the opposite ends of the minor axis of the lens will be slightly greater or of less radius than the corresponding portions of the lens form, and it therefore follows that the contour of the cut lens will be somewhat deformed as compared with the contour of the lens form, the degree of deformation depending somewhat upon the degree of curvature of different portions of the lens form and also upon the distance between the studs —63— as compared with that between the studs —62—.

If it is desired to change the position of the studs —62— and —63—, it is simply necessary to depress the bracket —37— against the action of the spring —36— sufficiently to withdraw the active studs from the lens former and to then swing the bracket laterally and depress the locking pin —66— against the action of the spring —68— by means of the finger piece —70—, whereupon the plate —61— may be rocked upon its pivot —64— to bring the other set of studs or rollers —63— into operative engagement with the lens form, said plate being locked in position by releasing the locking pin —66—, the bracket being then returned to its normal position to reëngage the active studs with the lens form.

The lens to be cut is placed upon its support —16— which is then elevated by means of the hand lever —19— to bring the lens into contact with the cutter and its holder —32—, whereupon the lens support and lens form which are coaxial may be rotated by means of the handle —28— through the medium of the gears 23, 24, 26 and 27 and flexible shaft —25—, one revolution of the lens support being usually sufficient to cut the lens to the desired form.

What I claim is:

1. A lens cutting machine having elliptical lens form sections adjustable transversely of the major axis thereof and means adjustably connecting said sections.

2. An elliptical lens form for lens cutting machines comprising opposite sections relatively adjustable transversely of the major axis of the lens form, rotarily adjustable means for adjusting said sections and means for holding the sections in their adjustable positions.

3. An elliptical lens form for lens cutting machines comprising opposite sections relatively adjustable transversely of the major axis of the lens form, said sections having cam slots eccentric to their axis of revolution, rotarily adjustable means engaging said slots for adjusting said sections and means for holding the sections in their adjusted positions.

4. A lens cutting machine having an elliptical lens form comprising elliptically grooved plates adjustable transversely of the major axis of the form, means for adjusting said plates and means for holding the sections in their adjusted positions.

5. In a lens cutting machine, a lens support, a rotary lens form co-axial therewith, means for transmitting rotary motion to the lens support and form, a lens cutter and supporting spindle therefor, said lens form having elliptically grooved plates adjustable transversely of the axis of the form, and connections between the cutter spindle and grooves of the plates for moving the cutter spindle relatively to the axis of revolution of the lens and form.

6. In a lens cutting machine, a rotary lens support and a co-axial rotary lens form having grooved sections adjustable transversely of its axis, a lens cutter, means co-acting with the grooves of the form sections for directing the movement of the cutter relatively to the axis of rotation of the lens support and form, and means for rotating the lens support and form simultaneously in the same direction.

7. In a lens cutting machine, in combination with a grooved lens form and lens cutter, operative connections between the groove of the lens form and cutter including separate pairs of studs, those of one pair being spaced a greater distance apart than those of the other pair, and means for positioning either pair of studs in the groove of the lens form.

In witness whereof I have hereunto set my hand on this tenth day of August 1912.

CHAUNCEY W. HOWLAND.

Witnesses:
ERASTUS HOPKINS,
WILLIAM J. ESPEY.

Copies of this patent may be obtained for five cents each, by addressing the "Commissioner of Patents, Washington, D. C."